United States Patent
Sedlmaier et al.

(10) Patent No.: US 6,213,914 B1
(45) Date of Patent: Apr. 10, 2001

(54) METHOD FOR SELECTING A GEAR POSITION OF AN AUTOMATIC TRANSMISSION

(75) Inventors: Anette Sedlmaier, Fahrenzhausen; Rudolf Ehrmaier, Munich; Josef Neuner, Raubling; Sigmund Fuerst, Maisach, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/438,387

(22) Filed: Nov. 12, 1999

(30) Foreign Application Priority Data

Nov. 12, 1998 (DE) .............................................. 198 52 292

(51) Int. Cl.⁷ .................................................. F16H 61/16
(52) U.S. Cl. ............................................................ 477/126
(58) Field of Search ........................... 74/336 R; 477/126

(56) References Cited

U.S. PATENT DOCUMENTS

| 4,419,909 | * | 12/1983 | Opperud et al. | ..................... 477/126 |
| 4,574,661 | * | 3/1986 | Opperud et al. | ..................... 477/126 |
| 4,680,983 | * | 7/1987 | Brown | ................................... 477/126 |
| 5,916,291 | * | 6/1999 | McKee | ............................... 74/336 R |

FOREIGN PATENT DOCUMENTS

| 36 90 165 | 3/1986 | (DE) . |
| 44 20 930 | 6/1994 | (DE) . |

* cited by examiner

Primary Examiner—Dirk Wright
(74) Attorney, Agent, or Firm—Evenson, McKeown, Edwards & Lenahan, P.L.L.C.

(57) ABSTRACT

The invention relates to a method for selecting a gear position of an automatic vehicle transmission with at least one forward gear position and a reverse gear position, in the case of which, at defined operating conditions, a shifting operation from the forward gear position into the reverse gear position or vice versa is ignored. The object of avoiding faulty operations when operating an automatic transmission and increasing the driving comfort is achieved in that the shifting operation is carried out up to a defined first speed of the vehicle, in that, in a speed range of the vehicle between the first and a second speed, during the shifting operation, only a neutral gear position is engaged, and in that the shifting operation is ignored above the second speed.

5 Claims, 1 Drawing Sheet

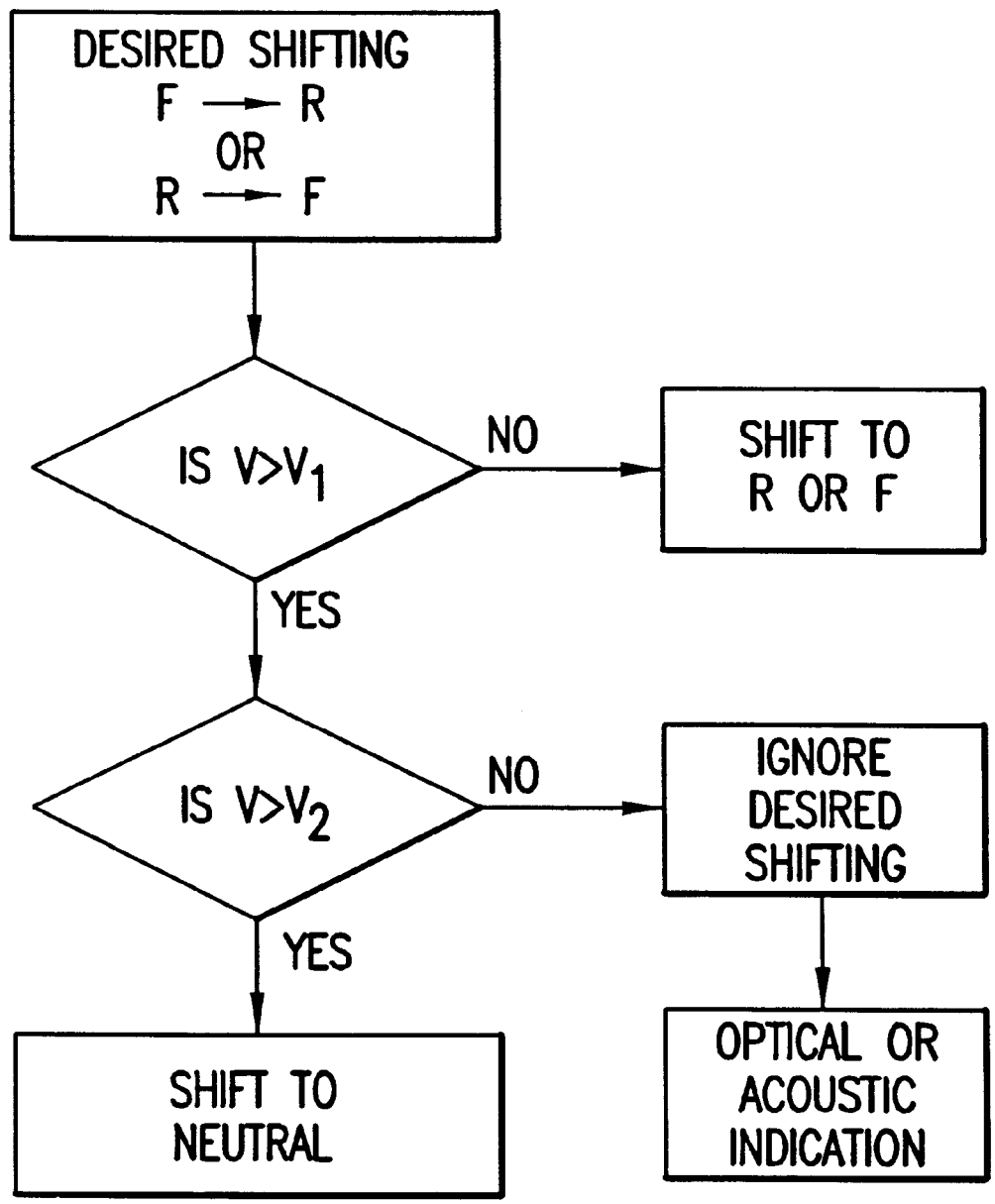

METHOD FOR SELECTING A GEAR POSITION OF AN AUTOMATIC TRANSMISSION

BACKGROUND OF THE INVENTION

This application claims priority of DE 198 52 292.4, filed Nov. 12, 1998, the disclosure of which is expressly incorporated by reference herein.

The present invention relates to a method for selecting a gear position of an automatic transmission with at least one forward driving position and a reverse driving position, in the case of which, at defined operating conditions, a shifting operation from the forward gear position into the reverse gear position or vice-versa is ignored, characterized in that the shifting operation is carried out up to a defined first speed of the vehicle ($v_1$)

Conventionally, different driving positions are provided in an automatic transmission. These include various forward driving position and at least one reverse driving position. In the case of a shifting operation from a forward driving position, for example, D, into a reverse driving position R, safety devices are installed in order to avoid damage to the transmission when shifting at an excessive vehicle speed.

In such a known shifting operation above a certain speed, the shifting operation is at first ignored. If the vehicle speed then falls below the defined limit speed, a subsequent engagement of the selected driving position will take place. This subsequent engagement of the stored driving position may surprise the driver and result in an uncomfortable engagement.

SUMMARY OF THE INVENTION

An object of the present invention is to provide a method which avoids the above-mentioned effects such as surprise in the event of faulty operations of an automatic transmission.

This object is achieved by a method in which, in a speed range of the vehicle between the first and a second speed ($v_1 < v < v_2$), during the shifting operation, only a neutral gear position is engaged; and ignoring the shifting operation above the second speed ($v_2$).

BRIEF DESCRIPTION OF THE DRAWINGS

Other objects, advantages and novel features of the present invention will become apparent from the following detailed description of the invention when considered in conjunction with the accompanying drawing.

The sole FIGURE is a flow chart showing the method of the present invention which can be implemented in a conventional automatic vehicle transmission by appropriate programming of a CPU.

DETAILED DESCRIPTION OF THE DRAWING

According to the invention, the shifting operation from a forward (F) into a reverse (R) driving position (R) (and/or optionally also vice-versa) is carried out up to a defined first speed of the vehicle of, for example, 2 to 10 km/h. If the vehicle speed is in a speed range between the first speed limit and a second speed limit still to be indicated, however only a neutral driving position (N) is engaged. No further shifting operation is stored and the just selected shifting position is also not engaged later time. The driver must then newly select the desired driving position at a speed below the first speed and he can also operate the previously engaged driving position.

At a vehicle speed above the second limit speed, which preferably is between 10 and 30 km/h, the shifting command is completely ignored. This is preferably indicated optically or acoustically to the driver.

The above-described invention avoids an unexpected shifting in a vehicle, and safety with respect to faulty operations as well as the driving comfort can be increased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for selecting a gear position of an automatic vehicle transmission with at least one forward driving position and a reverse driving position, comprising (a) permitting shifting between forward and reverse gear positions up to a defined first speed of the vehicle ($v_1$); (b) in a speed range of the vehicle between the first and a second speed ($v_1 < v < v_2$), engaging only a neutral gear position, and (c) ignoring a command signal for the shifting above the second speed ($v_2$).

2. The method according to claim 1, wherein the first speed limit value ($v_1$) is between 2 and 10 km/h, and the second speed limit value ($v_2$) is between 10 and 30 km/h.

3. The method according to claim 1, wherein the ignoring of the command signal is indicated to the driver.

4. The method of claim 3, wherein the first speed limit value ($v_1$) is between 2 and 10 km/h, and the second speed limit value ($v_2$) is between 10 and 30 km/h.

5. The method of claim 3, wherein the indication is optical or acoustic.

* * * * *